United States Patent

Matarazzo

[11] Patent Number: 5,515,033
[45] Date of Patent: May 7, 1996

[54] LOST PET LOCATOR

[76] Inventor: Ralph Matarazzo, 116 Main St., Apt. 7A, Malden, Mass. 02148

[21] Appl. No.: 301,061

[22] Filed: Sep. 6, 1994

[51] Int. Cl.$^6$ ................................................. G08B 21/00
[52] U.S. Cl. ........................ 340/573; 119/174; 119/859; 340/691; 340/825.49
[58] Field of Search ...................... 340/573, 691, 340/825.49; 119/174, 859, 858, 712, 720

[56] References Cited

U.S. PATENT DOCUMENTS

| 4,232,417 | 11/1980 | Miller et al. | 119/858 |
| 4,598,272 | 7/1986 | Cox | 340/573 |
| 5,337,041 | 8/1994 | Friedman | 340/825.49 |
| 5,355,839 | 10/1994 | Mistry | 119/858 |

Primary Examiner—Glen Swann
Attorney, Agent, or Firm—Gary E. Lambert; Scott B. Garrison

[57] ABSTRACT

A lost pet retrieval collar receives a coded radio signal and activates a puncturing device to release gas from a pressurized canister to inflate a balloon creating a visual alarm that the pet is lost. The pet collar also contains information necessary to enable a passerby to contact the pet owner. In one embodiment, the puncturing device utilizes a spring loaded pin; in a second embodiment, the puncturing device utilizes a solenoid valve; in a third embodiment, a laser is employed.

11 Claims, 5 Drawing Sheets

LOST PET LOCATOR

BACKGROUND OF THE INVENTION

The present invention relates generally to the field of missing property locators and more specifically, to pet collars having a radio-controlled indicator marking the pet as lost.

Missing property can cause owners of said property a great deal of anxiety. This situation may be heightened when there is an emotional attachment, in addition to the monetary value of the missing property. An example of property that, if lost, could have such a response is a pet. Recovering the pet is often of great importance to the owner. Further, a speedy recovery reduces the possibility of injury to the pet.

Generally, tagging the property with the owner's name and other identifying information has been utilized to inform a passerby of whose property it is and how to contact the owner. However, a pet wandering alone is not always lost, and the pet does not always have the identifying information in an accessible place. These factors can slow the recovery of a missing pet.

Further, a stranger may not approach an unfamiliar pet for fear of personal safety, especially when a tag with ownership information may or may not be located under the pet's jaws. This fear for personal safety by a passerby who would otherwise help in this situation will slow the recovery process even further.

Therefore, it is the object of this invention to provide an apparatus to alert a passerby that the subject pet is lost. Another object is to provide ownership information that is easily accessible to a passerby.

A further object is to encourage the passerby to aid in the speedy recovery of the missing pet, by reducing the passerby's fear.

These and other objects will become obvious and will appear hereinafter.

SUMMARY OF INVENTION

The aforementioned and other objects are achieved by the invention which provides, in one aspect, a device for locating missing property. The present invention provides an extremely versatile property locator device comprising an owner actuated coded radio signal, a receiver, preprogrammed circuit board, a pressurized gas canister, a puncturing mechanism, a valve and a balloon.

An owner actuated coded radio signal is transmitted by a hand held signaler with a five to ten mile range. The transmitter transmits a coded radio signal addressing the particular receiver with which it was fabricated. In other embodiments, the coded radio signal may be transmitted by a pager service when contacted by the owner of the missing property.

The coded radio signal is received by an electronic receiver. The electronic receiver's frequency accepts only the coded radio signal calibrated for that particular pet collar.

A preprogrammed electronic circuit board receives an electronic signal from the electronic receiver and responds automatically to inflate a balloon. In one embodiment, the electronic circuit board engages a magnet that, in turn, pulls a spring. The spring releases a puncturing mechanism which in turn releases noncorrosive gas to inflate a balloon. In a second embodiment, the electronic circuit board engages a solenoid valve which opens and releases noncorrosive gas to inflate a balloon. In a third embodiment, the electronic circuit board engages a laser which releases noncorrosive gas to inflate a balloon.

In each of the foregoing embodiments, the noncorrosive gas is transferred from a pressurized gas canister to a deflated balloon by a tube, which upon actuation inflates said balloon.

BRIEF DESCRIPTION OF THE DRAWINGS

The foregoing and other objects of this invention, the various features thereof, as well as the invention itself, may be more fully understood from the following description, when read together with the accompanying drawings which.

DESCRIPTION OF THE PREFERRED EMBODIMENT

While the present invention retains utility within a wide range of devices for locating property and may be embodied in several different forms, it is advantageously employed in connection with a collar mounted pet locating device. Though this is the form of the preferred embodiment and will be described as such, this embodiment should be considered illustrative and not restrictive.

Figure 1:
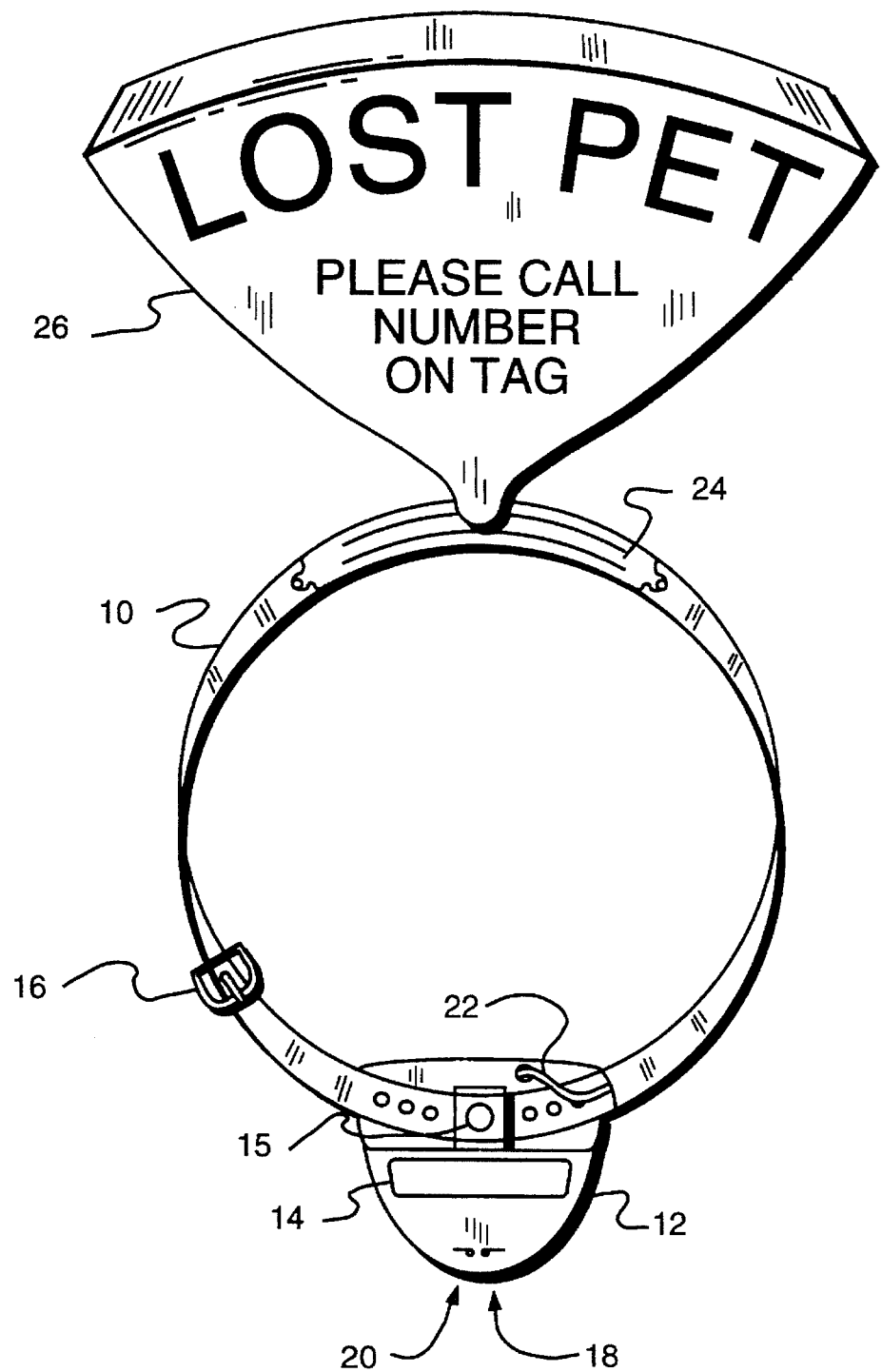
FIG. 1 is a diagrammatic front view of a pet collar embodying the present invention.

FIG. 1 depicts a collar 10 comprising a buckle 16 and an adjustment screw 15. The collar 10 is placed around the pet's neck and can be fit for size by both the buckle 16 and adjustment screw 15. A puncturing mechanism 12 is located at the bottom of the collar 10. On the outside of the puncturing mechanism 12 is a slide-in identification tag 14 containing pet and owner information, a low pressure indicator 18 and a low battery indicator 20. A tube 22 originates from the puncturing mechanism 12, continues along the collar 10, and terminates at a balloon 26. A balloon encasement 24 is located at the top of the pet collar. The balloon contains a visual alarm such as the one shown. Optionally, the balloon may be pre-printed with the owner's name and phone number such that a passerby does not have to approach the animal.

Figure 2:
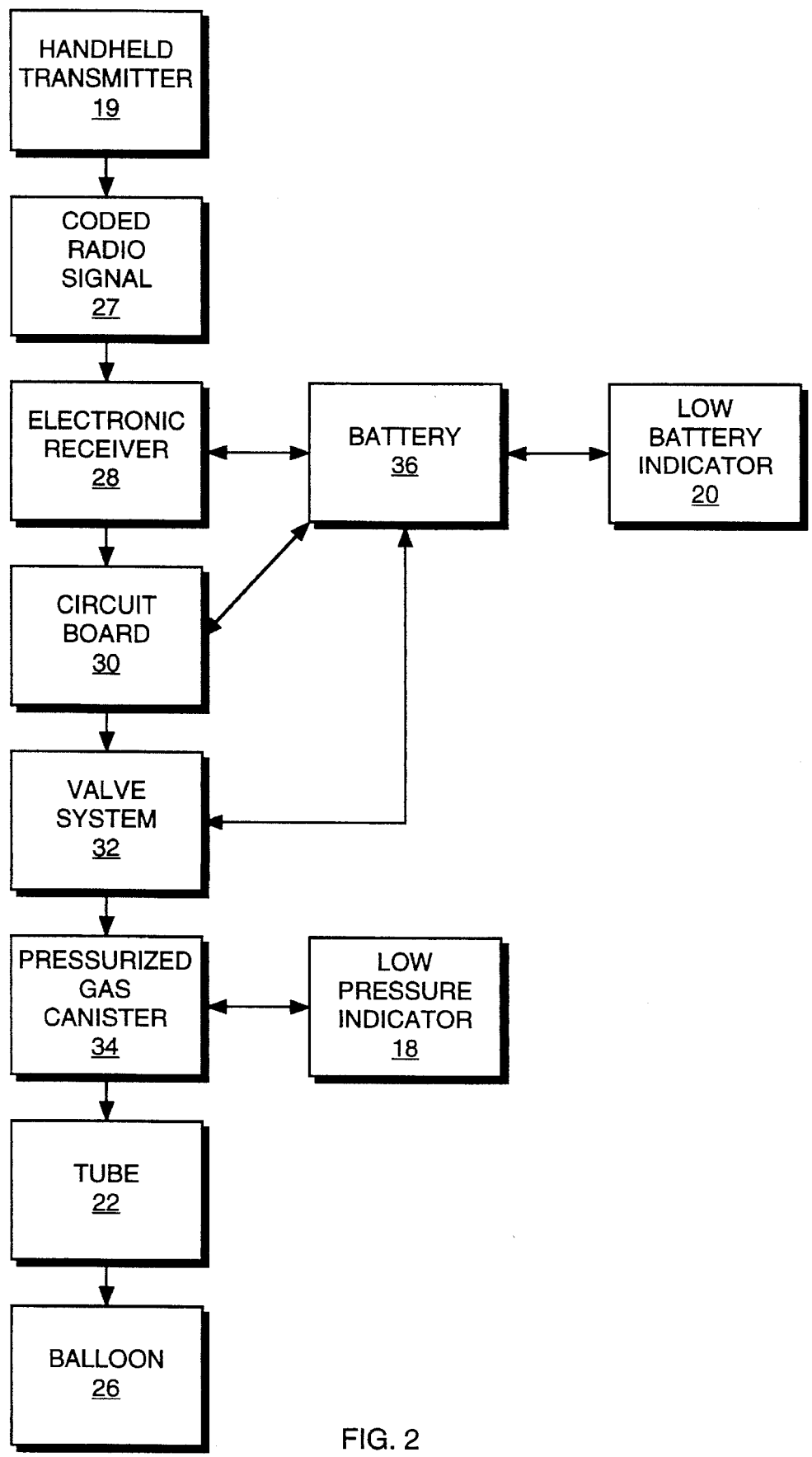
FIG. 2 is a block diagram showing a missing pet locator system.

The block diagram of FIG. 2 depicts the missing property locator system. In the missing property system, a coded radio signal 27 is transmitted by a pet owner from a hand held transmitter 19. Transmitter 19 generates the coded radio signal 27 that directly addresses a specific pet collar for which it was pre-programmed. In other embodiments, the coded radio signal 27 may be sent by a pager service, both initiated by the pet owner and both transmitting the coded radio signal.

Coded radio signal 27 is received by an electronic receiver 28 tuned to a specific frequency calibrated for that particular unit. Coded radio signal 27 is sent to a circuit board 30 where the code received is compared to the code programmed within the particular pet collar locator system. If the code does not match that of the particular system, the transmission is ignored. If there is a match, the missing property locator system is activated.

Upon activation a valve system 32 is actuated to release the contents of a pressurized gas canister 34. This release causes noncorrosive gas to be emptied from the pressurized gas canister 34 through a tube 22 into a balloon 26, thus inflating the balloon in a manner detailed below.

After use, the pressurized gas canister 34 is replaced and valve system 32 is reset to allow for continued service. The missing property locator system is powered by a battery 36. Status lights located on the face of the puncturing mechanism 12 indicate a low battery 20 and low pressure 18.

Figure 3:
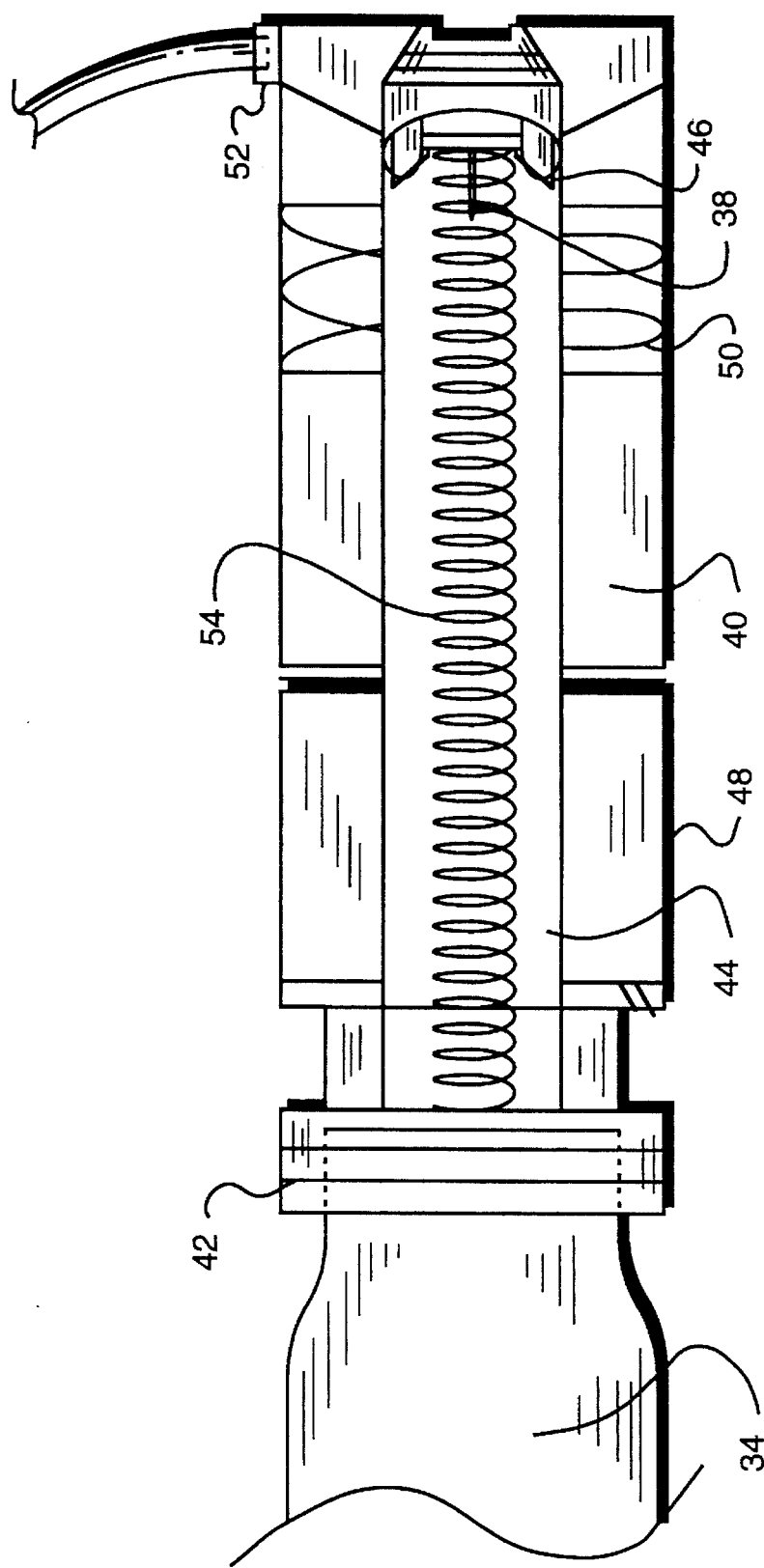
FIG. 3 is a diagrammatic view of the first embodiment employing a spring loaded pin puncturing mechanism.
Figure 4:
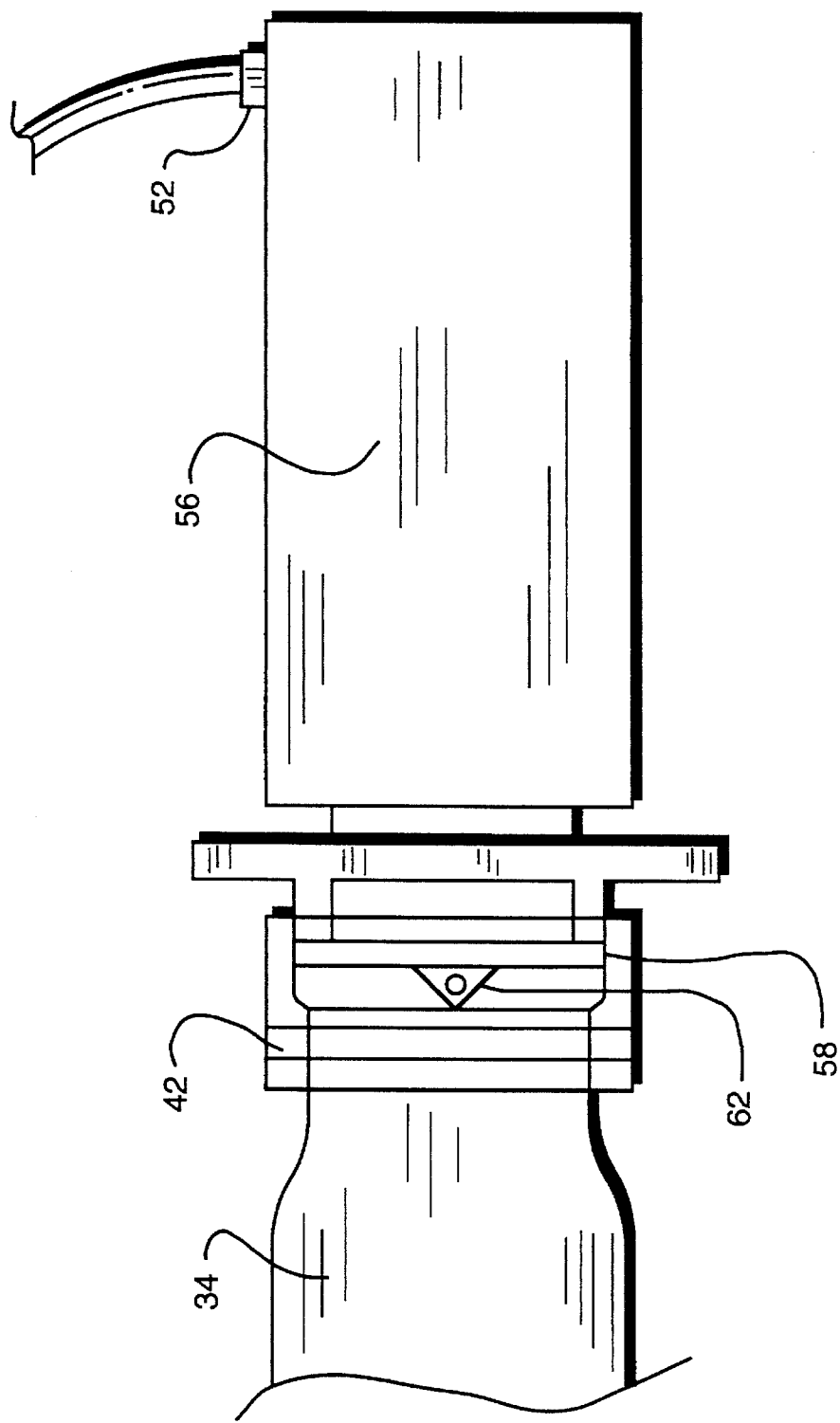
FIG. 4 is a diagrammatic view of the second embodiment employing a solenoid valve mechanism.
Figure 5:
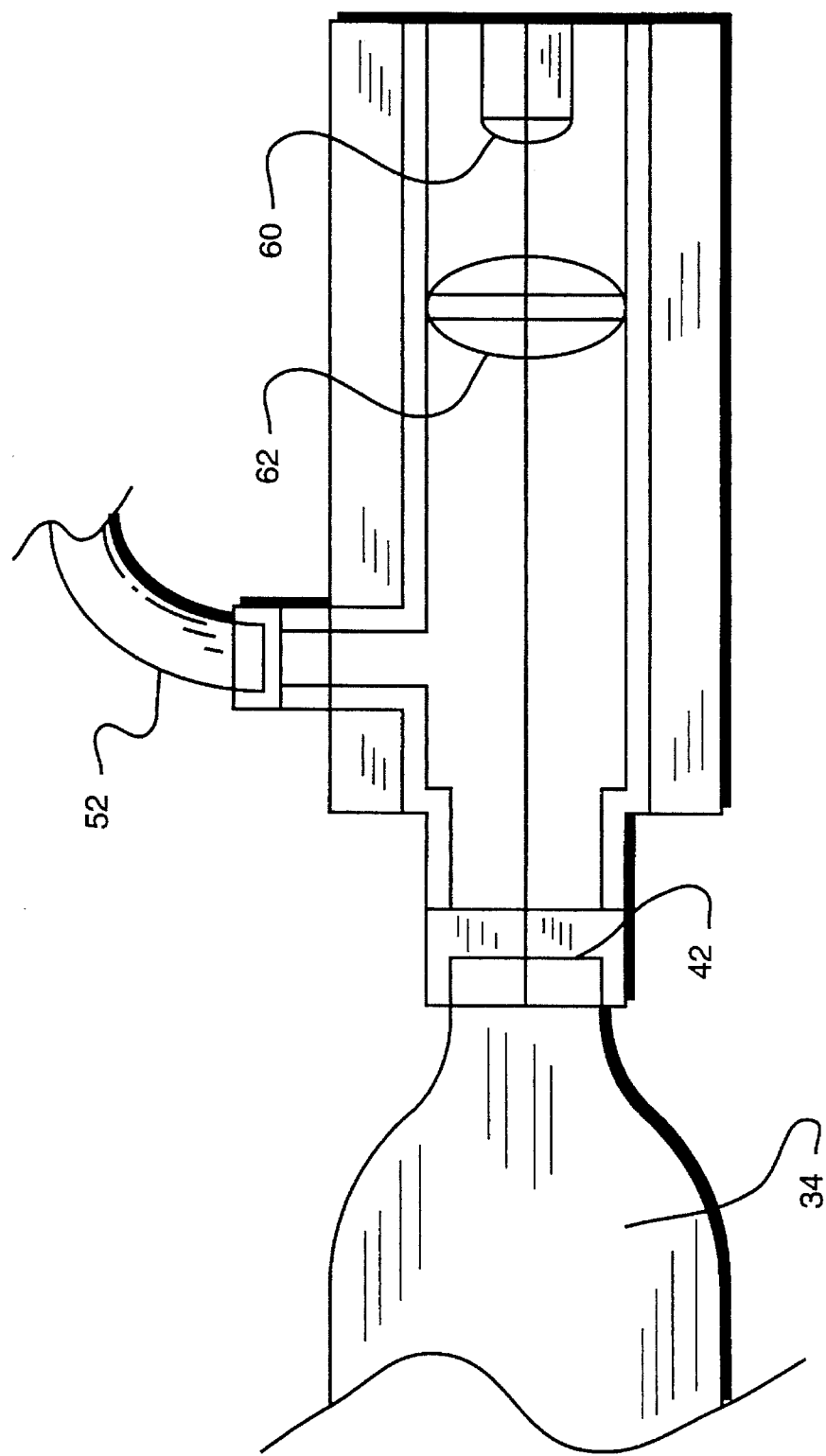
FIG. 5 is a diagrammatic view of the third embodiment employing a laser puncturing mechanism.

The valve system 32 is more completely detailed diagrammatically in FIGS. 3, 4, and 5. In the first embodiment of the valve system 32, depicted in FIG. 3, a canister seal 42 of a pressurized gas canister 34 is punctured by a pin 38. Upon receipt of an electrical signal from the circuit board 30 (FIG. 2), an electro-magnet 40 is energized which creates a draw force. The draw force exceeds the spring bias of the armature spring 50 which holds the pin in a normally open position. The spring bias having been overcome, pin 38 is released from the catch guide 46 sending the pin 38 down the valve body 48 through a tunnel 44 propelled by a puncture spring 54 to pierce said canister seal 42 to release the noncorrosive gas from said pressurized gas canister 34. Said gas travels through a tube outlet 52 to a tube 22 which communicates pressurized gas to inflate a balloon 26 scribed with information creating a visual alarm.

The second embodiment of the valve system 32 is depicted in FIG. 4. This embodiment utilizes a solenoid valve 56 which, upon electrical signal from the circuit board 30, opens and releases noncorrosive gas from the pressurized gas canister 34. The pressurized gas canister 34 is punctured by a puncture tip 62 when screwed into the valve system 32.

After receiving the actuation signal from the user, the circuit board 30 transmits the electrical signal indicating initiation of the process. The solenoid valve 56 then opens a movable plate 58 which is sealed, thus releasing the noncorrosive gas which exits the solenoid valve 56 through a tube outlet 52 into a tube 22. The tube 22 communicates the noncorrosive gas to inflate the balloon 26 (FIG. 1).

A third embodiment of the valve system 32 (FIG. 2) is depicted in FIG. 5. A laser diode 60 is employed to produce a beam of light which is focused by a double convex lens 62 on a canister seal 42. The beam of light ruptures the canister seal 42, thus releasing noncorrosive gas from the pressurized gas canister 34. The noncorrosive gas travels through a tube outlet 52, into the tube 22 which inflates the balloon 26 (FIG. 1) creating the visual alarm.

The invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for aiding a user in recovering missing property comprising means for generating an initiation signal;

receiver means mechanically attached to the missing property for receiving said initiation signal remotely;

indicator means responsive to said receiver means for creating an alarm on the missing property where said alarm is a balloon normally held in an uninflated state; and inflation means responsive to said receiver means for releasing stored gas into the balloon causing inflation of the balloon.

2. The apparatus according to claim 1 wherein said means for generating an initiation signal is a radio transmitter.

3. The apparatus according to claim 1 wherein said balloon is marked to indicate the alarm visibly.

4. A lost pet locator attached to a pet collar to aid in recovering a missing pet comprising receiver means set to a specific radio frequency for receiving an initiation signal at the same radio frequency and for processing said initiation signal to ensure that the initiation signal is at the same radio frequency and corresponds to the missing pet;

inflation means responsive to said receiver means for releasing pressurized gas;

balloon means inflated by the release of the pressurized gas for creating a visual alarm; and transmitter means for sending the initiation signal to be received by the receiver.

5. The lost pet locator of claim 4 wherein said inflation means further comprises canister means for storing pressurized gas.

6. The lost pet locator of claim 5 wherein said inflation means further comprises a device for pulling an armature spring causing a release of a puncturing spring to drive a pin into the canister means releasing said pressurized gas.

7. The lost pet locator of claim 6 wherein said device is a magnet.

8. The lost pet locator of claim 5 wherein said inflation means further comprises a solenoid valve for opening a movable plate, thereby releasing said pressurized gas.

9. The lost pet locator of claim 5 wherein said inflation means further comprises a laser diode employed to produce a beam of light on the canister means thereby rupturing the canister means and releasing pressurized gas.

10. The lost pet locator of claim 6 wherein said device further comprises a low pressure indicator to alert the user to low pressure in the canister means.

11. The lost pet locator of claim 6 wherein said device is battery powered and further comprises a low battery indicator to alert the user to low battery life.

* * * * *